United States Patent
Zhu

(10) Patent No.: US 11,394,515 B2
(45) Date of Patent: Jul. 19, 2022

(54) INFORMATION TRANSMISSION METHOD, DEVICE, AND SYSTEM, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 91 days.

(21) Appl. No.: 16/930,095

(22) Filed: Jul. 15, 2020

(65) Prior Publication Data

US 2020/0351058 A1 Nov. 5, 2020

Related U.S. Application Data

(63) Continuation of application No. PCT/CN2018/075147, filed on Feb. 2, 2018.

(51) Int. Cl.
*H04L 5/00* (2006.01)

(52) U.S. Cl.
CPC .......... *H04L 5/0055* (2013.01); *H04L 5/0005* (2013.01)

(58) Field of Classification Search
CPC ... H04L 5/0055; H04L 5/0005; H04L 1/0041; H04L 1/0061; H04L 1/0072; H04L 5/0007; H04L 1/1854; H04W 72/042; H04W 72/1278
See application file for complete search history.

(56) References Cited

U.S. PATENT DOCUMENTS

| 7,957,329 B2 * | 6/2011 | Ahn | H04L 5/0091 370/280 |
| 2012/0044890 A1 * | 2/2012 | Jen | H04L 5/0053 370/329 |
| 2012/0051313 A1 | 3/2012 | Seo et al. | |
| 2013/0170447 A1 * | 7/2013 | Lin | H04L 5/001 370/329 |
| 2013/0195065 A1 * | 8/2013 | Park | H04L 5/0055 370/329 |

(Continued)

FOREIGN PATENT DOCUMENTS

| CN | 101772181 A | 7/2010 |
| CN | 102858014 A | 1/2013 |

(Continued)

OTHER PUBLICATIONS

International Search Report in the International Application No. PCT/CN2018/075147 dated Oct. 11, 2018, (2p).

(Continued)

*Primary Examiner* — Pao Sinkantarakorn
*Assistant Examiner* — Kabir U Jahangir
(74) *Attorney, Agent, or Firm* — Arch & Lake LLP

(57) ABSTRACT

Methods, apparatuses, and storage medium are provided for information transmission. The method includes receiving target control information sent by a base station by means of a target downlink resource, determining a time-frequency location of the target uplink resource, and transmitting, according to the time-frequency location, response information to the base station by means of the target uplink resource, the response information being used to indicate whether user equipment (UE) has correctly received the target control information.

20 Claims, 6 Drawing Sheets

(56) References Cited

U.S. PATENT DOCUMENTS

| | | | | |
|---|---|---|---|---|
| 2014/0036856 | A1* | 2/2014 | Park | H04L 5/0053 370/329 |
| 2015/0207607 | A1* | 7/2015 | Tang | H04W 72/0413 370/330 |
| 2019/0335431 | A1* | 10/2019 | Wang | H04W 72/042 |
| 2020/0252165 | A1* | 8/2020 | Nunome | H04L 1/1607 |

FOREIGN PATENT DOCUMENTS

| | | |
|---|---|---|
| CN | 103178942 A | 6/2013 |
| CN | 103857041 A | 6/2014 |
| CN | 106301699 A | 1/2017 |
| CN | 106714320 A | 5/2017 |
| CN | 107295655 A | 10/2017 |
| CN | 107370580 A | 11/2017 |
| CN | 109417790 A | 3/2019 |
| EP | 2413526 A2 | 2/2012 |
| EP | 2894916 A1 | 7/2015 |
| JP | 2014011540 A | 1/2014 |
| WO | 2016182394 A1 | 11/2016 |
| WO | 2017113339 A1 | 7/2017 |
| WO | 2017116120 A1 | 7/2017 |

OTHER PUBLICATIONS

First Office Action of the Chinese Application No. 201880000052.5, dated Mar. 12, 2021, (14p).

Extended European Search Report in the European Application No. 18903648.6, dated Nov. 17, 2020, (9p).

English translation of the Written Opinion of the ISA of International Application No. PCT/CN2018/075147, dated Oct. 11, 2018, (4p).

Ericsson: "On AUL Confirmation", 3GPP TSG-RAN WG2 #100, Tdoc R2-1713521, Reno, Nevada, USA, Nov. 27, 2017, (3p).

Notice of Allowance of the Chinese application No. 201880000052. 5, dated Jan. 17, 2022, (5 pages).

* cited by examiner

INFORMATION TRANSMISSION METHOD, DEVICE, AND SYSTEM, AND STORAGE MEDIUM

CROSS-REFERENCE TO RELATED APPLICATIONS

This application is a continuation of International Application No. PCT/CN2018/075147, filed on Feb. 2, 2018, the entire contents of which are incorporated herein by reference in their entireties.

TECHNICAL FIELD

This application is related to the technical field of wireless communications. More specifically, this disclosure relates to a method, apparatus, and storage medium for information transmission.

BACKGROUND

In a communication system, a base station needs to send control information to user equipment (UE) so as to schedule the UE. The UE, after receiving the control information, may acquire corresponding communication data according to the control information. During practical implementation, there is likely a condition that the UE does not correctly receive the control information, and under this condition, the UE cannot acquire the corresponding communication data. For ensuring the correct acquisition of the communication data by the UE, the base station is required to determine whether the UE correctly receives the control information. Therefore, there is an urgent need for an information transmission method through which a base station can timely acquire control information receiving condition of UE at present.

SUMMARY

Examples of the present disclosure provide methods, apparatuses, and storage medium for controlling terminal access.

According to a first aspect of the present disclosure, an information transmission method is provided. The method may include target control information sent by a base station through a target downlink resource is received. The method may further include a time-frequency position of a target uplink resource is determined. The method may also include response information is sent to the base station through the target uplink resource according to the time-frequency position. The response information may be configured to indicate whether UE correctly receives the target control information.

According to a second aspect of the present disclosure, an information transmission device is provided. The information transmission device may include one or more processors; and a non-transitory computer-readable storage medium configured to store instructions executable by the one or more processors. The one or more processors may be configured to receive target control information sent by a base station through a target downlink resource. The one or more processors may further be configured to determine a time-frequency position of a target uplink resource. The one or more processors may also be configured to send response information to the base station through the target uplink resource according to the time-frequency position. The response information may be configured to indicate whether the information transmission device correctly receives the target control information.

According to a third aspect of the present disclosure, an information transmission device is provided. The information transmission device may include one or more processors and a non-transitory computer-readable storage medium configured to store instructions executable by the one or more processors. The one or more processors may be configured to send target control information to UE through a target downlink resource. The one or more processors may further be configured to determine a time-frequency position of a target uplink resource. The one or more processors may also be configured to receive response information sent by the UE through the target uplink resource according to the time-frequency position. The response information may be configured to indicate whether the UE correctly receives the target control information.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
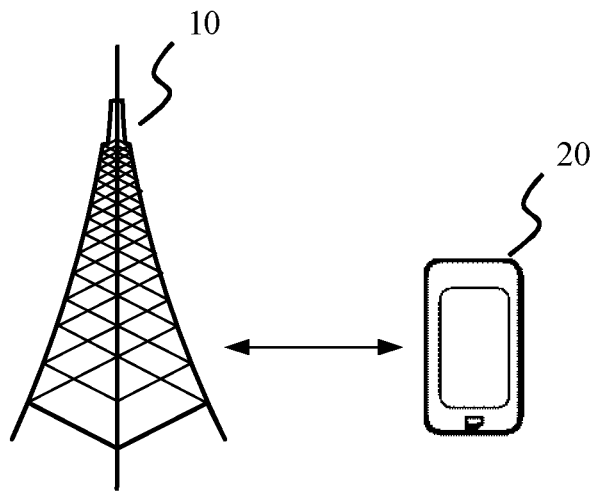
FIG. 1 is a schematic diagram illustrating an implementation environment, according to an example of the present disclosure.

A detailed description will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure, as recited in the appended claims.

In a communication system, a base station is usually required to schedule UE based on control information, and the control information may be downlink control information (DCI). The UE, when correctly receiving the control information sent by the base station, may acquire corresponding communication data based on the control information. However, when the UE does not correctly receive the control information sent by the base station, the UE cannot acquire the communication data. For ensuring the correct acquisition of the communication data by the UE, the base station is required to determine whether the UE correctly receives the control information and to give a response when the UE does not correctly receive the control information. For example, the response may be a response to retransmitting the control information.

Terms used in the disclosure are only for the purpose of describing specific embodiments and not intended to limit the disclosure. "a/an," "said," and "the" in a singular form in the disclosure and the appended claims are also intended to include a plural form unless other meanings are clearly denoted throughout the present disclosure. It is also to be understood that the term "and/or" used in the disclosure refers to and includes any or all possible combinations of one or multiple associated items that are listed.

It is to be understood that, although terms first, second, third, and the like may be used to describe various information in the embodiments of the present disclosure, the information should not be limited to these terms. These terms are only used to distinguish the information of the same type. For example, without departing from the scope of the disclosure, the first information may also be called second information, and, similarly, the second information may also be called first information. For example, the term "if" used here may be explained as "while" or "when" or "responsive to determining," which depends on the context.

Embodiments of the present disclosure provide an information transmission method. In the information transmission method, UE may send response information to a base station after receiving control information, and the response information may indicate whether the UE correctly receives the control information, such that the base station, after receiving the response information, may determine a control information receiving condition of the UE and may further give a subsequent response according to the receiving condition to ensure the correct acquisition of the communication data by the UE.

An implementation environment involved in the embodiments of the present disclosure will be described below. As illustrated in FIG. 1, the implementation environment involved in the embodiments of the present disclosure includes a base station 10 and UE 20, the base station 10 may be coupled with the UE 20 through a communication network, and the UE 20 is any UE in a cell served by the base station 10.

Figure 2:
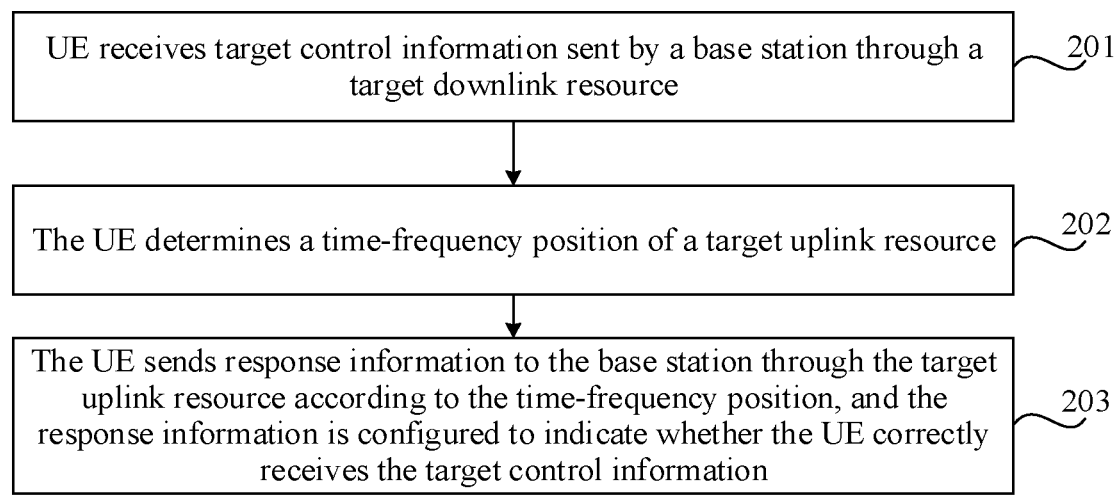
FIG. 2 is a flow chart showing an information transmission method, according to an example of the present disclosure.

FIG. 2 is a flow chart showing an information transmission method, according to an embodiment. As illustrated in FIG. 2, the information transmission method is applied to the UE 20 illustrated in FIG. 1. The information transmission method may include the following steps.

In step 201, the UE receives target control information sent by a base station through a target downlink resource.

Target control information, for example, may be control information, such as DCI, which may be used to acquire communication data.

In step 202, the UE determines a time-frequency position of a target uplink resource. The target uplink resource, for example, may be a communication resource, such as an uplink symbol, which may be used send information.

In step 203, the UE sends response information to the base station through the target uplink resource according to the time-frequency position, and the response information is configured to indicate whether the UE correctly receives the target control information.

From the above, according to the information transmission method provided in the embodiment of the present disclosure, the UE, after receiving the target control information sent by the base station, sends the response information for the target control information to the base station on the target uplink resource. The response information may indicate whether the UE correctly receives the target control information, such that the base station may timely acquire a target control information receiving condition of the UE, and normal acquisition of the communication data by the UE is further ensured.

Figure 3:
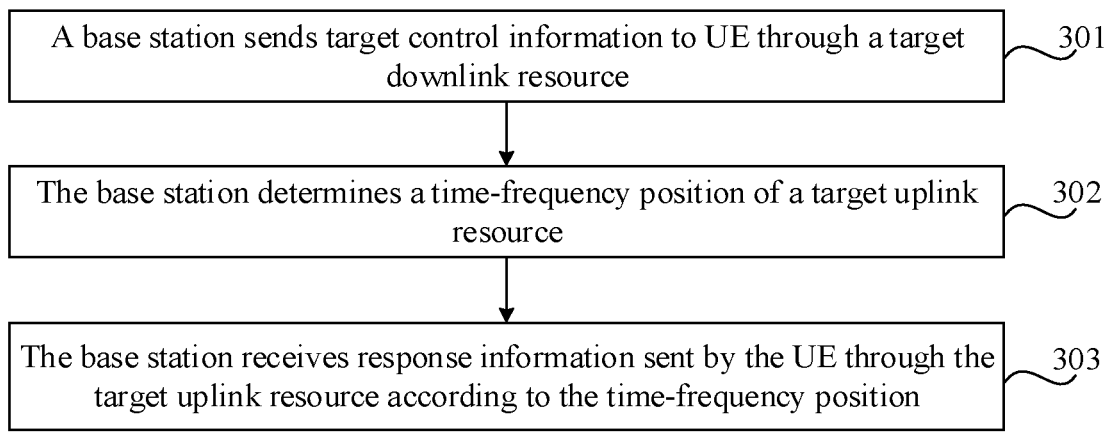
FIG. 3 is a flow chart showing an information transmission method, according to an example of the present disclosure.

FIG. 3 is a flow chart showing an information transmission method, according to an embodiment. As illustrated in FIG. 3, the information transmission method is applied to the base station 10 illustrated in FIG. 1. The information transmission method may include the following steps.

In step 301, the base station sends target control information to UE through a target downlink resource.

In step 302, the base station determines a time-frequency position of a target uplink resource.

In step 303, the base station receives response information sent by the UE through the target uplink resource according to the time-frequency position, and the response information is configured to indicate whether the UE correctly receives the target control information.

From the above, according to the information transmission method provided in the embodiment of the present disclosure, the base station, after sending the target control information to the UE, receives the response information of the UE for the target control information. The response information may indicate whether the UE correctly receives the target control information, such that the base station may timely acquire a target control information receiving condition of the UE, and normal acquisition of the communication data by the UE is further ensured.

Figure 4A:
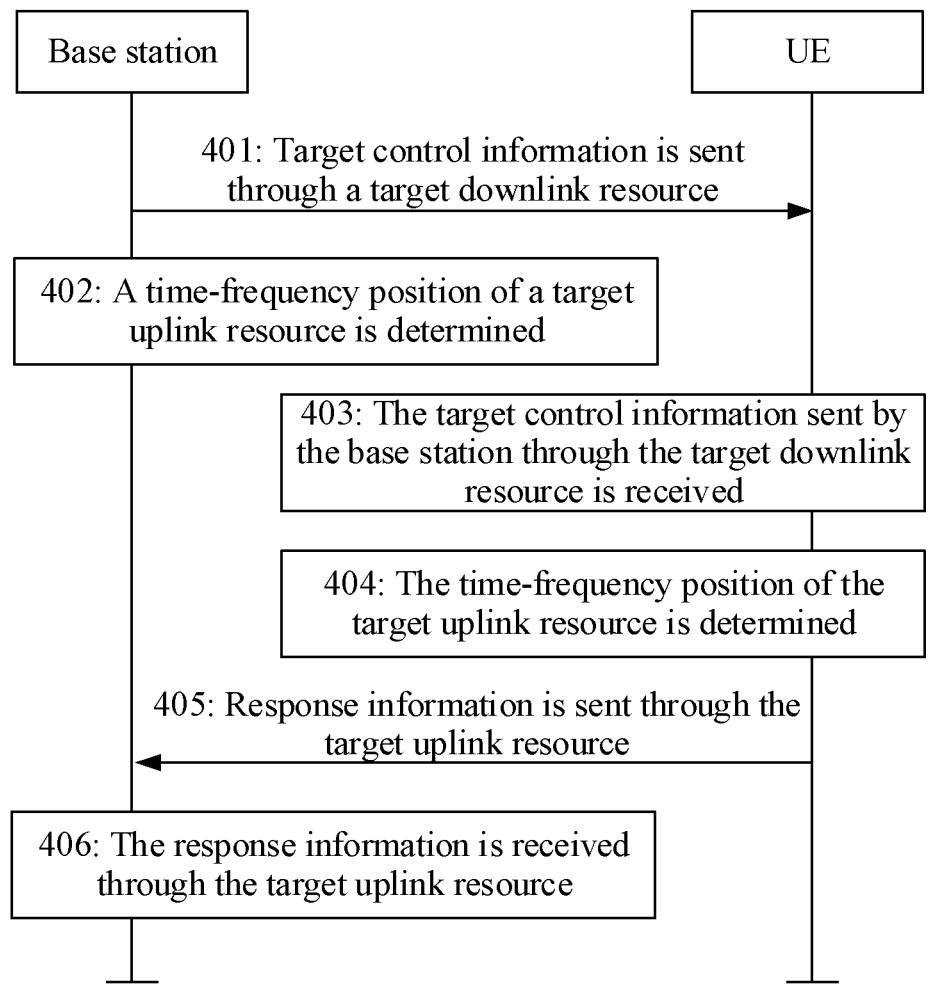
FIG. 4A is a flow chart showing an information transmission method, according to an example of the present disclosure.

FIG. 4A is a flow chart showing an information transmission method, according to an embodiment. As illustrated in FIG. 4A, the information transmission method is applied to the implementation environment illustrated in FIG. 1. The information transmission method may include the following steps.

In step 401, a base station sends target control information to UE through a target downlink resource.

The base station may send the target control information to the UE through the target downlink resource to schedule the UE according to the target control information. The target control information may be DCI. A physical downlink control channel (PDCCH) may be born in the target downlink resource. The target downlink resource may be a communication resource in a time domain such as a downlink symbol, a downlink subframe, or the like.

In step 402, the base station determines a time-frequency position of a target uplink resource.

The target uplink resource is an uplink resource allocated to the UE and configured to send response information. The target uplink resource may be a communication resource in the time domain, such as an uplink symbol, an uplink subframe, or the like. The response information may indicate whether the UE correctly receives the target control information sent by the base station. During practical implementation, the response information may be ACK information or NACK information, etc.

In some embodiments of the present disclosure, the base station is required to determine the time-frequency position of the target uplink resource, that is, the base station is required to execute the technical process in step 402 so as to receive the response information sent by the UE on the target uplink resource according to the time-frequency position in a subsequent step.

During practical implementation, the time-frequency position of the target uplink resource may be preset (for example, the time-frequency position of the target uplink resource may be specified by a communication protocol). Or, the time-frequency position of the target uplink resource may be related to a time-frequency position of the target downlink resource adopted by the base station to send the target control information. Or, the time-frequency position of the target uplink resource may be independently determined by the base station. Under the last condition, for ensuring that the UE may determine the time-frequency position of the target uplink resource, the base station is also required to send the independently determined time-frequency position of the target uplink resource to the UE.

The technical processes that the base station determines the time-frequency position of the target uplink resource under the three conditions will be described below in the embodiment of the present disclosure, respectively.

In the first condition, the time-frequency position of the target uplink resource is preset. Under this condition, the base station may determine the time-frequency position of the target uplink resource, according to presetting. For example, the base station may determine the time-frequency position of the target uplink resource according to a related provision of the communication protocol.

Optionally, the base station may acquire a preset first uplink time-frequency position set, and the first uplink time-frequency position set may include at least one uplink time-frequency position specified in the communication protocol and configured to transmit the response information. Then, the base station may determine a target uplink time-frequency position in the first uplink time-frequency position set and determine that the target uplink time-frequency position matches the time-frequency position of the target uplink resource.

Figure 4B:
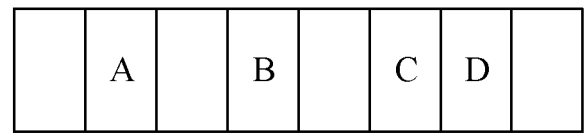
FIG. 4B is a schematic diagram illustrating a target uplink time-frequency position, according to an example of the present disclosure.

In a possible condition, it may be specified in the communication protocol that the UE sends the response information at any uplink time-frequency position in the first uplink time-frequency position set. For example, as illustrated in FIG. 4B, a resource A is the target downlink resource, and resources B, C, and D are uplink resources corresponding to uplink time-frequency positions in the first uplink time-frequency position set, respectively. Since it may be specified in the communication protocol that the UE sends the response information at any uplink time-frequency position in the first uplink time-frequency position set, the UE may send the response information on the resource C. Under this condition, the base station cannot determine the uplink time-frequency position adopted by the UE to send the response information, such that the base station may determine all the uplink time-frequency positions in the first uplink time-frequency position set as target uplink time-frequency positions and sequentially receive the response information at the uplink time-frequency positions in the first uplink time-frequency position set in a subsequent step until the response information is received.

In another possible condition, it may be specified in the communication protocol that the UE sends the response information at an uplink time-frequency position at a minimum spacing away from the target downlink resource in the time domain in the first uplink time-frequency position set. For example, as illustrated in FIG. 4B, the resource A is the target downlink resource, and the resources B, C and D are the uplink resources corresponding to the uplink time-frequency positions in the first uplink time-frequency position set respectively. Since it may be specified in the communication protocol that the UE sends the response information at the uplink time-frequency position at the minimum spacing away from the target downlink resource in the time domain in the first uplink time-frequency position set and a spacing between the resource B and the resource A in the time domain is minimum, the UE may send the response information on the resource B. Under this condition, the base station may determine the time-frequency position of the target downlink resource at first, and then the base station may assign the uplink time-frequency position at the minimum spacing away from the target downlink resource in the time domain in the first uplink time-frequency position set as the target uplink time-frequency position.

In the second condition, the time-frequency position of the target uplink resource is related to the time-frequency position of the target downlink resource. Under this condition, the base station may determine the time-frequency position of the target downlink resource at first and then determine the time-frequency position of the target uplink resource according to the time-frequency position of the target downlink resource.

In a possible condition, the base station may determine the time-frequency position of the target uplink resource according to the time-frequency position of the target downlink resource and a preset position binding rule.

The position binding rule may be a binding rule specified in the communication protocol and may also be a binding rule configured by the base station. When the position binding rule is the binding rule configured by the base station, the base station is further required to send the position binding rule to the UE through physical-layer signaling or high-layer signaling, and the high-layer signaling may be radio resource control (RRC) signaling or media access control (MAC) signaling, and the like. During practical implementation, the position binding rule may be a functional rule and the like. There are no specific limits made thereto in the embodiment of the present disclosure.

In another possible condition, the base station may determine the time-frequency position of the target uplink resource according to a time length required by control information processing of the UE and the time-frequency position of the target downlink resource.

Under a normal condition, different UE requires different time lengths for control information processing. Herein, "processing" refers to parsing the control information to determine whether the control information is correctly received. Therefore, the time-frequency position of the target uplink resource may be configured according to the time lengths required by control information processing of different UE to ensure that the UE may send the response information on the target uplink resource.

Under this condition, for determining the time-frequency position of the target uplink resource, the base station may determine the time length required by control information processing of the UE at first. Optionally, the base station may receive capability information configured to indicate the time length required by control information processing of the UE from the UE in a random access process of the UE, so as to determine the time length required by control information processing of the UE according to the capability information. Then, the base station may determine the time-frequency position of the target uplink resource according to the time length required by control information processing of the UE and the time-frequency position of the target downlink resource. A spacing between the time-frequency position of the target uplink resource and the time-frequency position of the target downlink resource in the time domain is greater than or equal to the time length required by control information processing of the UE.

In an embodiment of the present disclosure, the base station may determine a second uplink time-frequency position set at first, and the second uplink time-frequency position set includes at least one uplink time-frequency position at a spacing greater than or equal to the time length required by control information processing of the UE away from the time-frequency position of the target downlink resource in the time domain. Then, the base station may determine that the uplink time-frequency position at a minimum spacing away from the time-frequency position of the target downlink resource in the time domain in the second uplink time-frequency position set matches the time-frequency position of the target uplink resource.

Figure 4C:
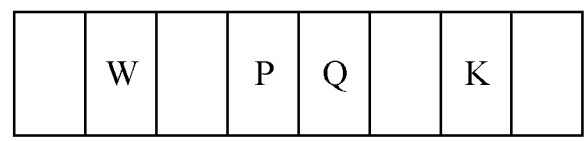
FIG. 4C is a schematic diagram illustrating a time-frequency position of a target uplink resource, according to an example of the present disclosure.

For example, as illustrated in FIG. 4C, a symbol P, a symbol Q, and a symbol K are uplink symbols, and a symbol W is a downlink symbol, the symbol W being the target downlink resource. The time length required by control information processing of the UE is a length of two symbols in the time domain. In such case, the base station may determine the uplink symbol Q or K at a spacing greater than or equal to two symbols away from the symbol W in the time domain as the symbol in the second uplink time-frequency position set, and then the base station may determine the symbol Q at a minimum spacing away from the symbol W in the time domain in the symbol Q and the symbol K as the target uplink resource.

In the third condition, the time-frequency position of the target uplink resource is independently determined by the base station. Under this condition, the base station may determine a certain uplink resource as the target uplink resource, and then the base station may send the time-frequency position of the target uplink resource to the UE to cause the UE to send the response information through the target uplink resource in the subsequent step.

Two methods through which the base station sends the time-frequency position of the target uplink resource to the UE are provided in the embodiment of the present disclosure.

In the first method, the base station, after determining the time-frequency position of the target uplink resource, generates first time-frequency position offset information, and the first time-frequency position offset information is configured to indicate the spacing between the time-frequency position of the target uplink resource and the time-frequency position of the target downlink resource in the time domain. Then the base station may send the first time-frequency position offset information to the UE through the target control information, that is, the base station may send the target control information including the first time-frequency position offset information to the UE, to cause the UE to determine the time-frequency position of the target uplink resource according to the first time-frequency position offset information and the time-frequency position of the target downlink resource.

During practical implementation, the first time-frequency position offset information may directly indicate the spacing between the time-frequency position of the target uplink resource and the time-frequency position of the target downlink resource in the time domain, and may also indirectly indicate the spacing between the time-frequency position of the target uplink resource and the time-frequency position of the target downlink resource in the time domain. "Indirect indicating" refers to that the first time-frequency position offset information may indicate an index, and the index is an index of a certain time-domain spacing value in a predefined time-domain spacing set.

It is to be pointed out that the first time-frequency position offset information is at a fixed or configurable position in the target control information and has a fixed or configurable length.

In the second method, the base station, after determining the time-frequency position of the target uplink resource, determines second time-frequency position offset information, and the second time-frequency position offset information is configured to indicate the spacing between the time-frequency position of the target uplink resource and the time-frequency position of the target downlink resource in the time domain. Then the base station may query a target scrambling sequence corresponding to the second time-frequency position offset information in a preset corresponding relationship table of time-frequency position offset information and a scrambling sequence. The base station may scramble the target control information based on the queried target scrambling sequence. For example, the base station may scramble a CRC of the target control information based on the target scrambling sequence, so as to cause the UE to, after determining the target scrambling sequence capable of descrambling the target control information, determine the second time-frequency position offset information according to the target scrambling sequence and determine the time-frequency position of the target uplink resource according to the second time-frequency position offset information and the time-frequency position of the target downlink resource.

In step 403, the UE receives the target control information sent by the base station through the target downlink resource.

The UE may receive the target control information on the PDCCH born in the target downlink resource.

In step 404, the UE determines the time-frequency position of the target uplink resource.

The UE, after receiving the target control information, is required to determine the time-frequency position of the target uplink resource, so as to send the response information for the target control information through the target uplink resource in the subsequent step.

During practical implementation, the UE may determine the time-frequency position of the target uplink resource in the same manner adopted by the base station to determine the time-frequency position of the target uplink resource. The manner adopted by the UE to determine the time-frequency position of the target uplink resource will be described below, still with the three conditions of the time-frequency position of the target uplink resource in the embodiment of the present disclosure.

In the first condition, the time-frequency position of the target uplink resource is preset. Under this condition, the UE may determine the time-frequency position of the target uplink resource, according to presetting. For example, the UE may determine the time-frequency position of the target uplink resource according to the related provision of the communication protocol.

Optionally, the UE may acquire the preset first uplink time-frequency position set, and then the UE may determine the target uplink time-frequency position in the first uplink time-frequency position set and determine the target uplink time-frequency position as the time-frequency position of the target uplink resource.

In a possible condition, it may be specified in the communication protocol that the UE sends the response information at any uplink time-frequency position in the first uplink time-frequency position set. Under this condition, the UE may determine any uplink time-frequency position in the first uplink time-frequency position set as the target uplink time-frequency position.

In another possible condition, it may be specified in the communication protocol that the UE sends the response information at the uplink time-frequency position at the minimum spacing away from the target downlink resource in the time domain in the first uplink time-frequency position set. Under this condition, the UE may determine that the uplink time-frequency position at the minimum spacing away from the target downlink resource in the time domain in the first uplink time-frequency position set matches the target uplink time-frequency position.

In the second condition, the time-frequency position of the target uplink resource is related to the time-frequency position of the target downlink resource. Under this condition, the UE may determine the time-frequency position of the target downlink resource at first and then determine the time-frequency position of the target uplink resource according to the time-frequency position of the target downlink resource.

In a possible condition, the UE may determine the time-frequency position of the target uplink resource according to the time-frequency position of the target downlink resource and the preset position binding rule.

The position binding rule may be the binding rule specified in the communication protocol and may also be the binding rule configured by the base station through the physical-layer signaling or the high-layer signaling.

In another possible condition, the UE may determine the time-frequency position of the target uplink resource according to the time length required by control information processing of the UE and the time-frequency position of the target downlink resource. The spacing between the time-frequency position of the target uplink resource and the time-frequency position of the target downlink resource in the time domain is greater than or equal to the time length required by control information processing of the UE.

In an embodiment of the present disclosure, the UE may determine the second uplink time-frequency position set at first, and then the UE may determine that the uplink time-frequency position at the minimum spacing away from the time-frequency position of the target downlink resource in the time domain in the second uplink time-frequency position set matches the time-frequency position of the target uplink resource.

In the third condition, the time-frequency position of the target uplink resource is independently determined by the base station. Under this condition, the UE may determine the time-frequency position of the target uplink resource according to an indication of the base station.

Optionally, the UE may parse the received target control information to obtain the first time-frequency position offset information included in the target control information, and then the UE may determine the time-frequency position of the target uplink resource according to the first time-frequency position offset information and the time-frequency position of the target downlink resource.

Or, the UE may acquire a preset scrambling sequence set, the scrambling sequence set includes at least one scrambling sequence, and the at least one scrambling sequence is recorded in the abovementioned corresponding relationship table of the time-frequency position offset information and the scrambling sequence. Then, the UE may sequentially descramble the target control information by using the scrambling sequence in the scrambling sequence set (for example, the UE may sequentially descramble the CRC of the target control information by using the scrambling sequence in the scrambling sequence set) until the target control information is successfully descrambled. The UE may determine the scrambling sequence capable of successfully descrambling the target control information in the scrambling sequence set as the target scrambling sequence, and query the second time-frequency position offset information corresponding to the target scrambling sequence in the corresponding relationship table of the time-frequency position offset information and the scrambling sequence (the corresponding relationship table may be sent to the UE by the base station). The UE may determine the time-frequency position of the target uplink resource according to the second time-frequency position offset information and the time-frequency position of the target downlink resource.

In step 405, the UE sends response information to the base station through the target uplink resource.

The UE, after receiving the target control information, may process the target control information to determine whether it correctly receives the target control information. For example, the UE may check the CRC of the target control information to determine whether it correctly receives the target control information. Then, the UE may send the response information to the base station through the target uplink resource to notify whether the UE correctly receives the target control information to the base station.

In step 406, the base station receives the response information sent by the UE through the target uplink resource.

The base station, after receiving the response information, may make a subsequent response according to the response information. For example, the subsequent response may be retransmitting the target control information when the response information indicates that the UE does not correctly receive the target control information.

From the above, according to the information transmission method provided in the embodiments of the present disclosure, the UE, after receiving the target control information sent by the base station, sends the response information for the target control information to the base station on the target uplink resource. The response information may indicate whether the UE correctly receives the target control information, such that the base station may timely acquire a target control information receiving condition of the UE, and normal acquisition of the communication data by the UE is further ensured.

Figure 5:
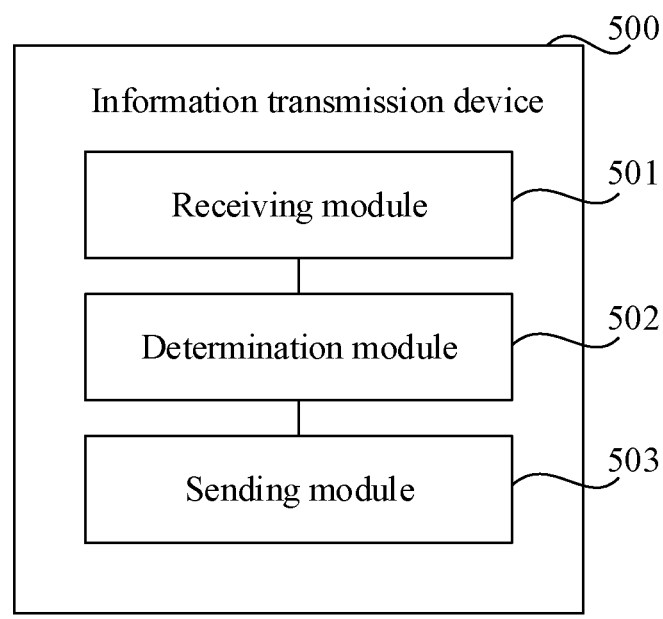
FIG. 5 is a block diagram of an information transmission device, according to an example of the present disclosure.

FIG. 5 is a block diagram of an information transmission device 500, according to an embodiment. The information transmission device 500 may be the UE 20 illustrated in FIG. 1. Referring to FIG. 5, the information transmission device 500 includes a receiving module 501, a determination module 502, and a sending module 503.

The receiving module 501 is configured to receive target control information sent by a base station through a target downlink resource.

The determination module 502 is configured to determine a time-frequency position of a target uplink resource.

The sending module 503 is configured to send response information to the base station through the target uplink resource according to the time-frequency position, and the response information is configured to indicate whether UE correctly receives the target control information.

In an embodiment of the present disclosure, the determination module 502 is configured to acquire a preset first uplink time-frequency position set, the first uplink time-frequency position set including at least one uplink time-frequency position configured to transmit the response information, determine a target uplink time-frequency position in the first uplink time-frequency position set and determine the target uplink time-frequency position as the time-frequency position of the target uplink resource.

In an embodiment of the present disclosure, the determination module 502 is configured to determine any uplink time-frequency position in the first uplink time-frequency position set as the target uplink time-frequency position.

In an embodiment of the present disclosure, the determination module 502 is configured to determine a time-frequency position of the target downlink resource, and determine the uplink time-frequency position at a minimum spacing away from the time-frequency position of the target downlink resource in a time domain in the first uplink time-frequency position set as the target uplink time-frequency position.

In an embodiment of the present disclosure, the determination module 502 is configured to determine a time-frequency position of the target downlink resource, and determine the time-frequency position of the target uplink resource according to the time-frequency position of the target downlink resource and a preset position binding rule.

In an embodiment of the present disclosure, the position binding rule is configured by the base station through high-layer signaling or physical-layer signaling; or, the position binding rule is specified in a communication protocol.

In an embodiment of the present disclosure, the determination module 502 is configured to determine a time length required by control information processing of the UE, determine a time-frequency position of the target downlink resource, and determine the time-frequency position of the target uplink resource; a spacing between the time-frequency position of the target uplink resource and the time-frequency position of the target downlink resource in a time domain is greater than or equal to the time length.

In an embodiment of the present disclosure, the determination module 502 is configured to determine a second uplink time-frequency position set, the second uplink time-frequency position set including at least one uplink time-frequency position at a spacing greater than or equal to the time length away from the time-frequency position of the target downlink resource in the time domain, and determine the uplink time-frequency position at a minimum spacing away from the time-frequency position of the target downlink resource in the time domain in the second uplink time-frequency position set as the time-frequency position of the target uplink resource.

In an embodiment of the present disclosure, the target control information includes first time-frequency position offset information, and the first time-frequency position offset information is configured to indicate a spacing between the time-frequency position of the target uplink resource and a time-frequency position of the target downlink resource in a time domain, and the determination module 502 is configured to determine the time-frequency position of the target downlink resource and determine the time-frequency position of the target uplink resource according to the time-frequency position of the target downlink resource and the first time-frequency position offset information.

In an embodiment of the present disclosure, the target control information is scrambled by the base station based on a target scrambling sequence; and the determination module 502 is configured to determine the target scrambling sequence, acquire second time-frequency position offset information corresponding to the target scrambling sequence, the second time-frequency position offset information being configured to indicate a spacing between the time-frequency position of the target uplink resource and a time-frequency position of the target downlink resource in a time domain, determine the time-frequency position of the target downlink resource and determine the time-frequency position of the target uplink resource according to the time-frequency position of the target downlink resource and the second time-frequency position offset information.

In an embodiment of the present disclosure, the determination module 502 is configured to acquire a preset scrambling sequence set, the scrambling sequence set including at least one scrambling sequence, sequentially descramble the target control information by using the scrambling sequence in the scrambling sequence set and determine that the scrambling sequence capable of successfully descrambling the target control information in the scrambling sequence set matches the target scrambling sequence.

In an embodiment of the present disclosure, a CRC of the target control information is scrambled by the base station based on the target scrambling sequence; and the determination module 502 is configured to sequentially descramble the CRC of the target control information by using the scrambling sequence in the scrambling sequence set.

In an embodiment of the present disclosure, the response information is ACK information or NACK information.

From the above, according to the information transmission device provided in the embodiment of the present disclosure, the UE, after receiving the target control information sent by the base station, sends the response information for the target control information to the base station on the target uplink resource. The response information may indicate whether the UE correctly receives the target control information, such that the base station may timely acquire a target control information receiving condition of the UE, and normal acquisition of the communication data by the UE is further ensured.

With respect to the device in the above embodiment, the specific manners for performing operations for individual modules therein have been described in detail in the embodiments regarding the method, which will not be elaborated herein.

Figure 6:
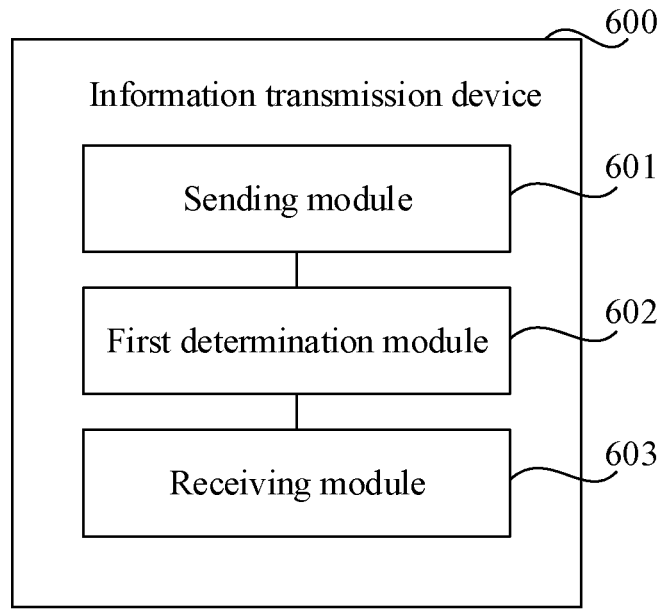
FIG. 6 is a block diagram of an information transmission device, according to an example of the present disclosure.

FIG. 6 is a block diagram of an information transmission device 600, according to an embodiment. The information transmission device 600 may be the base station 10 illustrated in FIG. 1. Referring to FIG. 6, the information transmission device 600 includes a sending module 601, a first determination module 602, and a receiving module 603.

The sending module 601 is configured to send target control information to UE through a target downlink resource.

The first determination module 602 is configured to determine a time-frequency position of a target uplink resource.

The receiving module 603 is configured to receive response information sent by the UE through the target uplink resource according to the time-frequency position, and the response information is configured to indicate whether the UE correctly receives the target control information.

In an embodiment of the present disclosure, the first determination module 602 is configured to acquire a preset first uplink time-frequency position set, the first uplink time-frequency position set including at least one uplink time-frequency position configured to transmit the response information, determine a target uplink time-frequency position in the first uplink time-frequency position set and determine the target uplink time-frequency position as the time-frequency position of the target uplink resource.

In an embodiment of the present disclosure, the first determination module 602 is configured to determine all the uplink time-frequency positions in the first uplink time-frequency position set as the target uplink time-frequency position.

Correspondingly, the receiving module 603 is configured to sequentially receive the response information at the uplink time-frequency position in the first uplink time-frequency position set until the response information is received.

In an embodiment of the present disclosure, the first determination module 602 is configured to determine a time-frequency position of the target downlink resource and determine the uplink time-frequency position at a minimum spacing away from the time-frequency position of the target downlink resource in a time domain in the first uplink time-frequency position set as the target uplink time-frequency position.

In an embodiment of the present disclosure, the first determination module 602 is configured to determine a time-frequency position of the target downlink resource and determine the time-frequency position of the target uplink resource according to the time-frequency position of the target downlink resource and a preset position binding rule.

In an embodiment of the present disclosure, the first determination module 602 is configured to determine a time length required by control information processing of the UE, determine a time-frequency position of the target downlink resource and determine the time-frequency position of the target uplink resource, a spacing between the time-frequency position of the target uplink resource and the time-frequency position of the target downlink resource in a time domain being greater than or equal to the time length.

In an embodiment of the present disclosure, the first determination module 602 is configured to acquire capability information sent by the UE in a random access process, and the capability information is configured to indicate the time length required by control information processing of the UE.

In an embodiment of the present disclosure, the first determination module 602 is configured to determine a second uplink time-frequency position set, the second uplink time-frequency position set including at least one uplink time-frequency position at a spacing greater than or equal to the time length away from the time-frequency position of the target downlink resource in the time domain, and determine the uplink time-frequency position at a minimum spacing away from the time-frequency position of the target downlink resource in the time domain in the second uplink time-frequency position set as the time-frequency position of the target uplink resource.

In an embodiment of the present disclosure, the response information is ACK information or NACK information.

Figure 7:
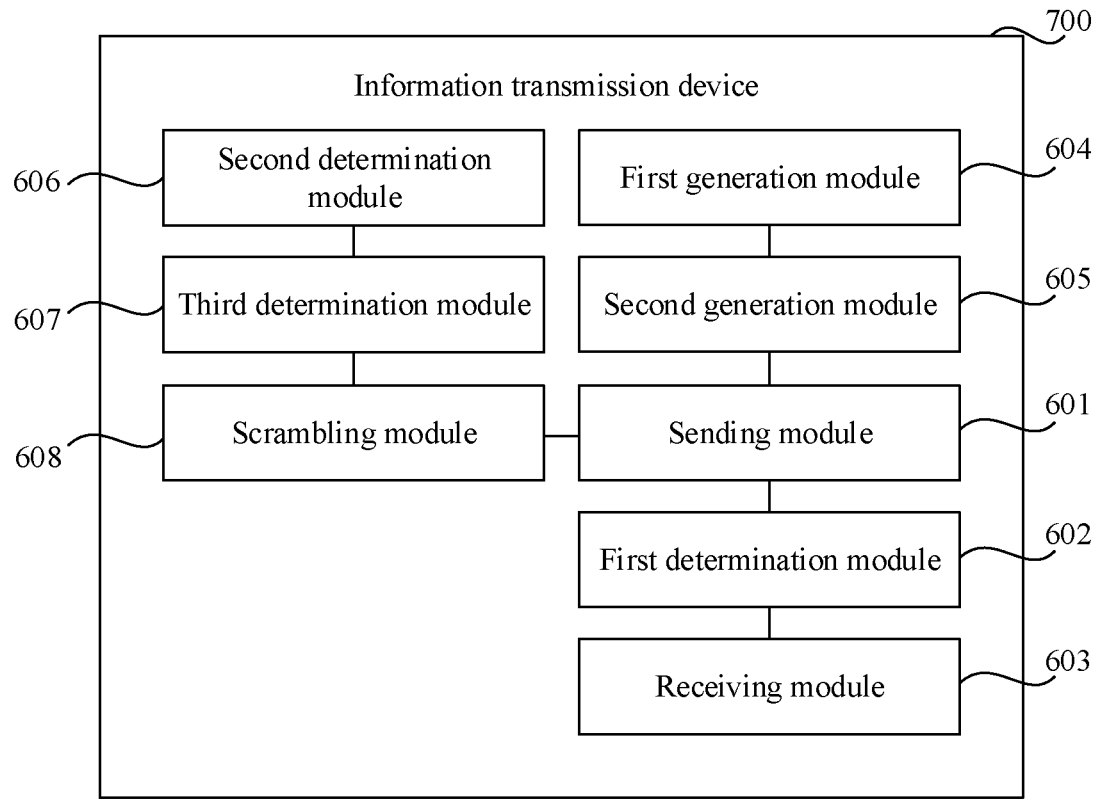
FIG. 7 is a block diagram of an information transmission device, according to an example of the present disclosure.

As illustrated in FIG. 7, an embodiment of the present disclosure also provides an information transmission device 700. Besides each module in the information transmission device 600, the information transmission device 700 further includes a first generation module 604, a second generation module 605, a second determination module 606, a third determination module 607, and a scrambling module 608.

The first generation module 604 is configured to, after the time-frequency position of the target uplink resource is determined, generate first time-frequency position offset information, the first time-frequency position offset information being configured to indicate a spacing between the time-frequency position of the target uplink resource and a time-frequency position of the target downlink resource in a time domain.

The second generation module 605 is configured to generate the target control information, the target control information including the first time-frequency position offset information, and the first time-frequency position offset information is configured to instruct the UE to determine the time-frequency position of the target uplink resource according to the time-frequency position of the target downlink resource and the first time-frequency position offset information.

The second determination module 606 is configured to, after the time-frequency position of the target uplink resource is determined, determine second time-frequency position offset information, and the second time-frequency position offset information is configured to indicate a spacing between the time-frequency position of the target uplink resource and a time-frequency position of the target downlink resource in a time domain.

The third determination module 607 is configured to determine a target scrambling sequence corresponding to the second time-frequency position offset information.

The scrambling module 608 is configured to scramble the target control information based on the target scrambling sequence to cause the UE to, after determining the target scrambling sequence, determine the time-frequency position of the target uplink resource according to the second time-frequency position offset information corresponding to the target scrambling sequence and the time-frequency position of the target downlink resource.

In an embodiment of the present disclosure, the scrambling module 608 is configured to scramble a CRC of the target control information based on the target scrambling sequence.

From the above, according to the information transmission device provided in the embodiment of the present disclosure, after the target control information is sent to the UE, the response information of the UE for the target control information is received, and the response information may indicate whether the UE correctly receives the target control information, such that the base station may timely acquire a target control information receiving condition of the UE, and normal acquisition of the communication data by the UE is further ensured.

With respect to the device in the above embodiment, the specific manners for performing operations for individual modules therein have been described in detail in the embodiments regarding the method, which will not be elaborated herein.

Figure 8:
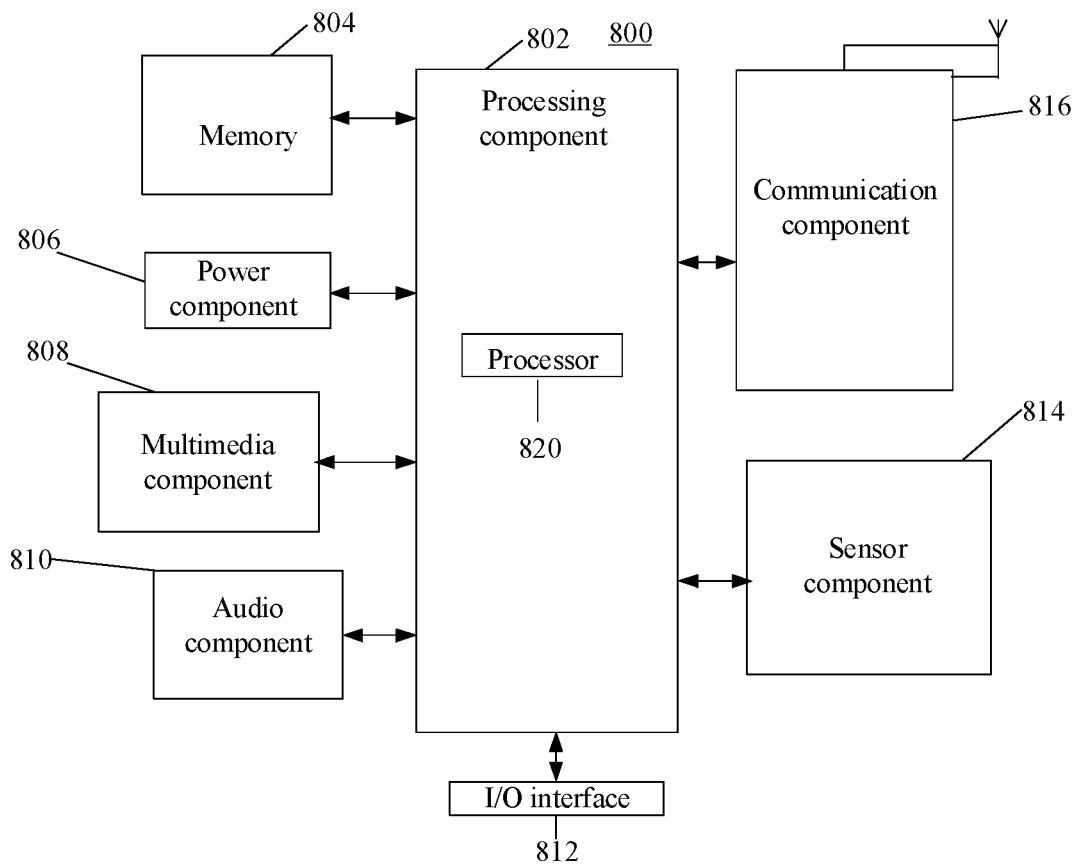
FIG. 8 is a block diagram of an information transmission device, according to an example of the present disclosure.

FIG. 8 is a block diagram of an information transmission device 800, according to an embodiment. For example, the device 800 may be a mobile phone, a computer, a digital broadcast terminal, a messaging device, a gaming console, a tablet, a medical device, exercise equipment, a personal digital assistant, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the abovementioned method. Moreover, the processing component 802 may include one or more modules that facilitate interaction between the processing component 802 and other components. For instance, the processing component 802 may include a multimedia module to facilitate interaction between the multimedia component 808 and the processing component 802.

The memory 804 is configured to store various types of data to support the operation of the device 800. Examples of such data include instructions for any applications or methods operated on device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the device 800. The power component 806 may include a power management system, one or more power supplies, and other components associated with generation, management, and distribution of power for the device 800.

The multimedia component 808 includes a screen providing an output interface between the device 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes, and gestures on the TP. The touch sensors may not only sense a boundary of a touch or swipe action but also detect a period of time and a pressure associated with the touch or swipe action. In some embodiments, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the device 800 is in an operation mode, such as a call mode, a recording mode, and a voice recognition mode. The received audio signal may further be stored in the memory 804 or sent through the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button, and a locking button.

The sensor component 814 includes one or more sensors configured to provide status assessments in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect the presence of an object nearby without any physical contact. The sensor component 814 may also include a light sensor, such as a complementary metal-oxide semiconductor (CMOS) or charge coupled device (CCD) image sensor, configured for use in an imaging application. In some embodiments, the sensor component 814 may also include an acceleration sensor, a gyroscope sensor, a magnetic sensor, a pressure sensor or a temperature sensor.

The communication component 816 is configured to facilitate wired or wireless communication between device 800 and other devices. The device 800 may access a communication-standard-based wireless network, such as a wireless fidelity (WiFi) network, a 2nd-generation (2G) or 3rd-generation (3G) network or a combination thereof. In an embodiment, the communication component 816 receives a broadcast signal or broadcast associated information from an external broadcast management system through a broadcast channel. In an embodiment, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology and other technologies.

In an embodiment, the device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the method executed by UE in the information transmission methods provided in the embodiments of the present disclosure.

In an embodiment, there is also provided a non-transitory computer-readable storage medium, including instructions, such as included in the memory 804, executed by the processor 820 of the device 800 to implement the method executed by UE in the information transmission methods provided in the embodiments of the present disclosure. For example, the non-transitory computer-readable storage medium may be a ROM, a random access memory (RAM), a compact disc read-only memory (CD-ROM), a magnetic tape, a floppy disc, an optical data storage device, and the like.

Figure 9:
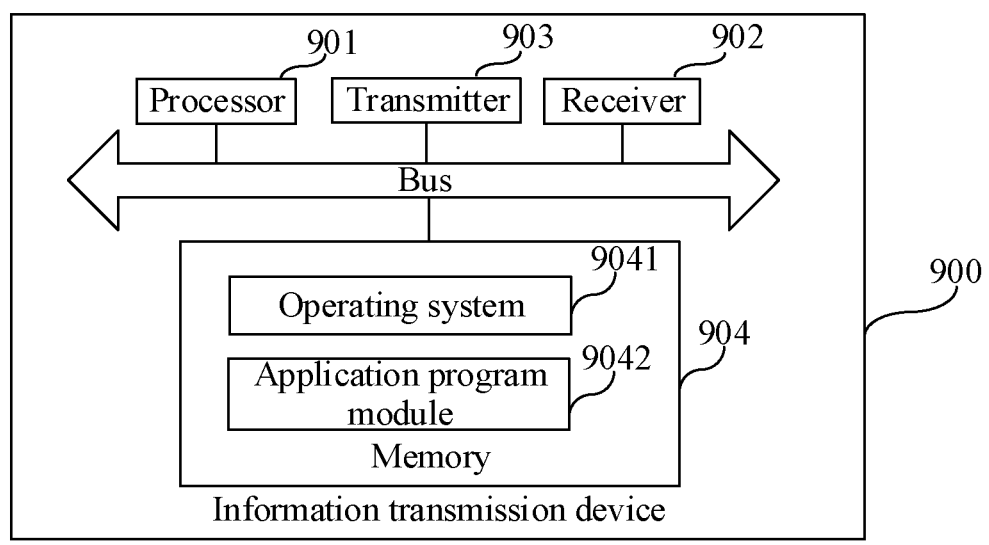
FIG. 9 is a block diagram of an information transmission device, according to an example of the present disclosure.

FIG. 9 is a block diagram of an information transmission device 900, according to an embodiment. For example, the information transmission device 900 may be a base station. As illustrated in FIG. 9, the information transmission device 900 may include a processor 901, a receiver 902, a transmitter 903, and a memory 904. The receiver 902, the transmitter 903, and the memory 904 are coupled with the processor 901 through a bus, respectively.

The processor 901 includes one or more than one processing core, and the processor 901 runs a software program and a module to execute the method executed by a base station in the information transmission methods provided in the embodiments of the present disclosure. The memory 904 may be configured to store the software program and the module. Specifically, the memory 904 may store an operating system 9041 and an application program module 9042 required by at least one function. The receiver 902 is configured to receive communication data sent by other devices, and the transmitter 903 is configured to send communication data to the other devices.

Figure 10:
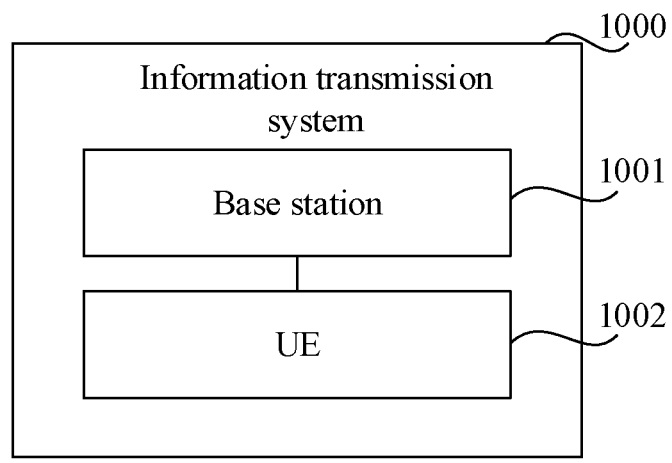
FIG. 10 is a block diagram of an information transmission system, according to an example of the present disclosure.

FIG. 10 is a block diagram of an information transmission system 1000, according to an embodiment. As illustrated in FIG. 10, the information transmission system 1000 includes a base station 1001 and UE 1002.

The base station 1001 is configured to execute the information transmission method executed by a base station in the embodiment illustrated in FIG. 4.

The UE 1002 is configured to execute the information transmission method executed by UE in the embodiment illustrated in FIG. 4.

There is also provided a computer-readable storage medium in an embodiment. A computer program is stored in the computer-readable storage medium. The stored computer program may be executed by a processing component to implement an information transmission method. For example, the information transmission method may include: target control information sent by a base station through a target downlink resource is received; a time-frequency position of a target uplink resource is determined, and response information is sent to the base station through the target uplink resource according to the time-frequency position, the response information being configured to indicate whether UE correctly receives the target control information.

Or, the information transmission method may include: target control information is sent to UE through a target downlink resource; a time-frequency position of a target uplink resource is determined, and response information sent by the UE is received through the target uplink resource according to the time-frequency position, the response information being configured to indicate whether the UE correctly receives the target control information.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within the known or customary practice in the art. It is intended that the specification and examples be considered as an example only, with a true scope and spirit of the present disclosure being indicated by the following claims.

It will be appreciated that the present disclosure is not limited to the exact construction that has been described above and illustrated in the accompanying drawings and that various modifications and changes may be made without departing from the scope thereof. It is intended that the scope of the present disclosure only be limited by the appended claims.

What is claimed is:

1. An information transmission method, comprising:
receiving target control information sent by a base station through a target downlink resource;
determining a time-frequency position of a target uplink resource; and
sending response information to the base station through the target uplink resource according to the time-frequency position, the response information being configured to indicate whether user equipment (UE) correctly receives the target control information;
wherein the target control information comprises first time-frequency position offset information, and the first time-frequency position offset information is configured to indicate a spacing between the time-frequency position of the target uplink resource and a time-frequency position of the target downlink resource in a time domain; and wherein determining the time-frequency position of the target uplink resource comprises:
determining the time-frequency position of the target downlink resource; and
determining the time-frequency position of the target uplink resource according to the time-frequency position of the target downlink resource and the first time-frequency position offset information.

2. An information transmission device, comprising:
one or more processors; and
a non-transitory computer-readable storage medium storing instructions executable by the one or more processors, wherein the one or more processors are configured to:
receive target control information sent by a base station through a target downlink resource;
determine a time-frequency position of a target uplink resource;
send response information to the base station through the target uplink resource according to the time-frequency position, the response information being configured to indicate whether the information transmission device correctly receives the target control information;
determine a time-frequency position of the target downlink resource, wherein the target control information comprises first time-frequency position offset information, and the first time-frequency position offset information is configured to indicate a spacing between the time-frequency position of the target uplink resource and a time-frequency position of the target downlink resource in a time domain; and
determine the time-frequency position of the target uplink resource according to the time-frequency position of the target downlink resource and the first time-frequency position offset information.

3. The information transmission device of claim 2, wherein the one or more processors are configured to:
acquire a preset first uplink time-frequency position set, wherein the preset first uplink time-frequency position set comprises at least one uplink time-frequency position configured to transmit the response information;
determine a target uplink time-frequency position in the preset first uplink time-frequency position set; and
determine that the target uplink time-frequency position matches the time-frequency position of the target uplink resource.

4. The information transmission device of claim 3, wherein the one or more processors are configured to:
  determine whether any uplink time-frequency position in the preset first uplink time-frequency position set matches the target uplink time-frequency position.

5. The information transmission device of claim 3, wherein the one or more processors are configured to:
  determine a time-frequency position of the target downlink resource; and
  determine that the uplink time-frequency position at a minimum spacing away from the time-frequency position of the target downlink resource in a time domain in the preset first uplink time-frequency position set matches the target uplink time-frequency position.

6. The information transmission device of claim 2, wherein the one or more processors are configured to:
  determine a time-frequency position of the target downlink resource; and
  determine the time-frequency position of the target uplink resource according to the time-frequency position of the target downlink resource and a preset position binding rule.

7. The information transmission device of claim 2, wherein the one or more processors are configured to:
  determine a time length required by control information processing of the information transmission device;
  determine a time-frequency position of the target downlink resource; and
  determine the time-frequency position of the target uplink resource, a spacing between the time-frequency position of the target uplink resource and the time-frequency position of the target downlink resource in a time domain being greater than or equal to the time length.

8. The information transmission device of claim 7, wherein the one or more processors are configured to:
  determine a second uplink time-frequency position set, wherein the second uplink time-frequency position set comprises at least one uplink time-frequency position at a spacing greater than or equal to the time length away from the time-frequency position of the target downlink resource in the time domain; and
  determine that the uplink time-frequency position at a minimum spacing away from the time-frequency position of the target downlink resource in the time domain in the second uplink time-frequency position set matches the time-frequency position of the target uplink resource.

9. The information transmission device of claim 2, wherein the one or more processors are configured to:
  determine a target scrambling sequence, wherein the target control information is scrambled by the base station based on the target scrambling sequence; and;
  acquire second time-frequency position offset information corresponding to the target scrambling sequence, the second time-frequency position offset information being configured to indicate a spacing between the time-frequency position of the target uplink resource and a time-frequency position of the target downlink resource in a time domain;
  determine the time-frequency position of the target downlink resource; and
  determine the time-frequency position of the target uplink resource according to the time-frequency position of the target downlink resource and the second time-frequency position offset information.

10. The information transmission device of claim 9, wherein the one or more processors are configured to:
  acquire a preset scrambling sequence set, wherein the scrambling sequence set comprises at least one scrambling sequence;
  sequentially descramble the target control information by using the scrambling sequence in the scrambling sequence set; and
  determine that the scrambling sequence capable of successfully descrambling the target control information in the scrambling sequence set matches the target scrambling sequence.

11. The information transmission device of claim 10, wherein the one or more processors are configured to:
  sequentially descramble a cyclic redundancy check (CRC) of the target control information by using the scrambling sequence in the scrambling sequence set, wherein the CRC of the target control information is scrambled by the base station based on the target scrambling sequence.

12. An information transmission device, comprising:
  one or more processors; and
  a non-transitory computer-readable storage medium storing instructions executable by the one or more processors, wherein the one or more processors are configured to:
  determine a time-frequency position of a target uplink resource;
  generate, after the time-frequency position of the target uplink resource is determined, first time-frequency position offset information, the first time-frequency position offset information being configured to indicate a spacing between the time-frequency position of the target uplink resource and a time-frequency position of a target downlink resource in a time domain; and
  generate a target control information, the target control information including the first time-frequency position offset information configured to instruct the UE to determine the time-frequency position of the target uplink resource according to the time-frequency position of the target downlink resource and the first time-frequency position offset information;
  send target control information to user equipment (UE) through the target downlink resource;
  receive response information sent by the UE through the target uplink resource according to the time-frequency position, the response information being configured to indicate whether the UE correctly receives the target control information.

13. The information transmission device of claim 12, wherein the one or more processors are configured to:
  acquire a preset first uplink time-frequency position set, wherein the preset first uplink time-frequency position set comprises at least one uplink time-frequency position configured to transmit the response information;
  determine a target uplink time-frequency position in the preset first uplink time-frequency position set; and
  determine that the target uplink time-frequency position matches the time-frequency position of the target uplink resource.

14. The information transmission device of claim 13, wherein the one or more processors are configured to:
  determine that all the uplink time-frequency positions in the preset first uplink time-frequency position set match the target uplink time-frequency position; and sequentially receive the response information at the uplink time-frequency position in the preset first uplink time-frequency position set until the response information is received.

15. The information transmission device of claim 13, wherein the one or more processors are configured to:
   determine a time-frequency position of the target downlink resource; and
   determine that the uplink time-frequency position at a minimum spacing away from the time-frequency position of the target downlink resource in a time domain in the preset first uplink time-frequency position set matches the target uplink time-frequency position.

16. The information transmission device of claim 12, wherein the one or more processors are configured to:
   determine a time-frequency position of the target downlink resource; and
   determine the time-frequency position of the target uplink resource according to the time-frequency position of the target downlink resource and a preset position binding rule.

17. The information transmission device of claim 12, wherein the one or more processors are configured to:
   determine a time length required by control information processing of the UE;
   determine a time-frequency position of the target downlink resource; and
   determine the time-frequency position of the target uplink resource, wherein a spacing between the time-frequency position of the target uplink resource and the time-frequency position of the target downlink resource in a time domain is greater than or equal to the time length.

18. The information transmission device of claim 17, wherein the one or more processors are configured to:
   acquire capability information sent by the UE in a random access process, the capability information being configured to indicate the time length required by control information processing of the UE.

19. The information transmission device of claim 17, wherein the one or more processors are configured to:
   determine a second uplink time-frequency position set, wherein the second uplink time-frequency position set comprises at least one uplink time-frequency position at a spacing greater than or equal to the time length away from the time-frequency position of the target downlink resource in the time domain; and
   determine the uplink time-frequency position at a minimum spacing away from the time-frequency position of the target downlink resource in the time domain in the second uplink time-frequency position set as the time-frequency position of the target uplink resource.

20. The information transmission device of claim 12, wherein the one or more processors are further configured to:
   determine, after the time-frequency position of the target uplink resource is determined, second time-frequency position offset information, the second time-frequency position offset information being configured to indicate a spacing between the time-frequency position of the target uplink resource and a time-frequency position of the target downlink resource in a time domain;
   determine a target scrambling sequence corresponding to the second time-frequency position offset information; and
   scramble, after determining the target scrambling sequence, the target control information based on the target scrambling sequence to cause the UE to determine the time-frequency position of the target uplink resource according to the second time-frequency position offset information corresponding to the target scrambling sequence and the time-frequency position of the target downlink resource.

* * * * *